United States Patent
Meng

(10) Patent No.: US 10,562,791 B2
(45) Date of Patent: Feb. 18, 2020

(54) PROCESS FOR PREPARATION OF GRANULAR MATERIAL

(71) Applicant: Metalsoft Center, Piscataway, NJ (US)

(72) Inventor: Xiaoguang Meng, Piscataway, NJ (US)

(73) Assignee: Metalsoft Center, Piscataway, NJ (US)

( * ) Notice: Subject to any disclaimer, the term of this patent is extended or adjusted under 35 U.S.C. 154(b) by 77 days.

(21) Appl. No.: 15/987,233

(22) Filed: May 23, 2018

(65) Prior Publication Data

US 2019/0359501 A1 Nov. 28, 2019

(51) Int. Cl.
*C02F 1/28* (2006.01)
*B01J 20/30* (2006.01)
*B01J 20/02* (2006.01)
*B01J 20/28* (2006.01)
*C02F 101/22* (2006.01)
*C02F 101/10* (2006.01)
*C02F 101/00* (2006.01)

(52) U.S. Cl.
CPC .......... *C02F 1/281* (2013.01); *B01J 20/0229* (2013.01); *B01J 20/28004* (2013.01); *B01J 20/28059* (2013.01); *B01J 20/3042* (2013.01); *B01J 20/3078* (2013.01); *C02F 1/288* (2013.01); *C02F 1/283* (2013.01); *C02F 2101/003* (2013.01); *C02F 2101/103* (2013.01); *C02F 2101/106* (2013.01); *C02F 2101/22* (2013.01)

(58) Field of Classification Search
CPC .. C02F 1/28; C02F 1/288; C02F 1/283; C02F 2101/003; C02F 2101/103; C02F 2101/106; C02F 2101/22; B01J 20/0229; B01J 20/28004; B01J 20/28059; B01J 20/3042; B01J 20/3078
USPC .......................................................... 502/402
See application file for complete search history.

(56) References Cited

U.S. PATENT DOCUMENTS

2008/0071129 A1* 3/2008 Yang ...................... B01D 15/00
588/301

* cited by examiner

*Primary Examiner* — Edward M Johnson
(74) *Attorney, Agent, or Firm* — Gearhart Law, LLC

(57) ABSTRACT

The present disclosure provides for a method for producing porous granular composite iron having high permeability, hydrophilicity, reactivity, and capacity for treatment of inorganic and organic contaminants. The method may include the steps of: mixing iron powder, or iron/metal mixture and adsorbent powders, with surface modifier and binder compounds to form a granular material. This granular material is used in a filter, vessel, and in situ permeable reactive barrier by passing a contaminated liquid stream through a bed of the granular product for removal of the contaminants. The porous granular iron materials have low bulk density, do not fuse together and can be regenerated for reuse.

9 Claims, 6 Drawing Sheets

PROCESS FOR PREPARATION OF GRANULAR MATERIAL

CLAIM OF PRIORITY

This application is a non-provisional application and claims no priority to any patent or patent application.

FIELD OF THE EMBODIMENTS

The field of the embodiments of the present invention relate to products and/or methods for removing dissolved contaminants from liquid streams. In particular, the present invention and its embodiments relate to preparations and methods thereof of porous granular iron and the treatment of inorganic and organic contaminants in water.

BACKGROUND OF THE EMBODIMENTS

Groundwater, surface water, and wastewater may contain inorganic and organic toxic compounds, such as but not limited to arsenic, selenium, uranium, mercury, chromium, pesticides, and chlorinated and nitro organic chemicals, due to natural and anthropogenic sources. To protect human health and the environments, the contaminants have to be removed from drinking water and wastewater to meet government imposed regulatory limits.

Zero valent iron or metallic iron is an economic and effective material for treatment of inorganic and organic pollutants in water, soil, and gas. Iron products, in nano particulate, fine powder, granular, and scrape forms, have been used for treatment of arsenic, heavy metals, and organic contaminants. However, nano iron particles are expensive and can be readily oxidized. Fine iron powder is difficult to be used in filters and in situ permeable reactive barriers because of the low hydraulic conductivity of iron particles. Furthermore, these iron particles will fuse into a mass due to formation of iron oxides. Such masses have large iron particles and scraps have low specific surface and reactivity.

To solve the low hydraulic conductivity and fusion problems of small metallic iron particles, it is necessary to provide the embodiments of the present invention, as other attempts to solve such problems, as noted below have not achieved satisfactory results.

U.S. Pat. No. 6,387,276 pertains to a method for mixing zero valent iron filings with a sand component to achieve the desired permeability. The mixture is used in ex-situ water treatment systems and in situ permeable wall or reactive barrier groundwater treatment systems for removal of arsenic.

U.S. Pat. No. 6,942,807 pertains to a water filtration apparatus, comprising a vibration device attached to a filtration vessel and a bed of metallic iron particles within said vessel, for treatment of water contaminated with heavy metals and organic compounds. The vibration prevents the fusion of iron particles during filtration treatment of water.

U.S. Pat. No. 6,602,320 pertains to a method for producing reduced iron comprises agglomerating a raw material mixture containing a carbonaceous reducing agent and an iron oxide-containing material into small agglomerates, heating the agglomerate within a heat reduction furnace, thereby reducing the iron oxide in the agglomerate to produce solid reduced iron, or further heating the solid reduced iron, melting the metallic iron produced by the reduction, and coagulating the molten metallic iron while separating the slag component contained in the small agglomerates to provide granular metallic iron.

U.S. Pat. No. 7,611,637 pertains to methods for preparing generally spherical hollow and/or porous zero valent iron particles having a diameter no larger than about ten millimeters and a porosity greater than 0.1 for treatment of contaminated water. The zero valent iron particles are produced using a sacrificial substrate and thermal treatment, comprising the steps of: a) preparing a generally spherical substrate of a material that can be converted to volatile matter or a gas at elevated temperature; b) coating said substrate with metallic iron to form a substantially continuous layer at least 0.25 nm thick; c) exposing said coated substrate to one of a chemical reagent or a temperature high enough to remove said substrate to form a hollow iron particle; and d) reducing iron oxides in said particle to metallic iron.

U.S. Pat. No. 9,452,413 pertains to a porous and permeable composite for treatment of contaminated fluids. The composite includes a body of iron particles and 0.01-10% by weight of at least one functional ingredient distributed and locked in the pores and cavities of the iron body. The iron body is prepared using compaction and/or heat to form a porous and permeable iron particle structure.

Various devices are known in the art. However, their structure and means of operation are substantially different from the present disclosure. The other inventions fail to solve all the problems taught by the present disclosure. At least one embodiment of the present invention is presented below and will be described in more detail herein.

SUMMARY OF THE EMBODIMENTS

Generally, the present invention and its embodiments describe a process for producing hydrophilic porous granular composite iron products having high permeability, hydrophilicity, reactivity, and capacity for treatment of inorganic and organic contaminants in liquid and gas.

The method may include the steps of mixing iron powder (or mixture of iron and other metal and adsorbent powders) with surface modifiers and/or binders for the formation of hydrophilic agglomerates, drying the agglomerates, and sieving the dried particles to obtain a porous granular product within a certain range of particle size. The surface modifiers and binders could be selected from the group consisting of: polyvinyl alcohol, povidone, polyvinyl pyrrolidone, and polyvinyl acetate. The porous granular product is utilized in a filter, reactor, or in situ permeable reactive barrier for the treatment of contaminants. The dissolved inorganic and organic contaminants may include but are not limited to arsenic, selenium, chromium, lead, cadmium, copper, mercury, uranium, chlorinated and nitro organic compounds, etc.

In one embodiment of the present invention there is a method for producing porous granular composite iron for removal of inorganic and organic contaminants from liquid streams, the method comprising the steps of: mixing raw iron powders with at least one surface modifier and binder compound to induce a formation of hydrophilic granules; drying the hydrophilic granules to form a porous aggregate, wherein the porous aggregate have a particle size in a range of about 0.15 mm to about 30 mm and a surface area larger than 0.5 $m^2/g$; passing a contaminated liquid through a bed of the porous aggregate.

In another embodiment of the present invention there is a method for producing porous granular composite iron for removal of inorganic and organic contaminants from liquid streams, the method comprising the steps of: mixing iron powder and at least one other metal and/or adsorbent powder with at least one surface modifier and binder compound to induce a formation of hydrophilic granules; drying the hydrophilic granules to form a porous aggregate, wherein the porous aggregate have a particle size in a range of about 0.15 mm to about 30 mm and a surface area larger than 0.5 $m^2/g$; and passing a contaminated liquid through a bed of the porous aggregate.

In general, the present invention succeeds in conferring the following, and others not mentioned, benefits and objectives.

It is an object of the present invention to provide a filtration medium that is reusable.

It is an object of the present invention to provide a method to reduce contaminants in a liquid stream.

It is an object of the present invention to remove organic and inorganic contaminants from a liquid or a gas.

It is an object of the present invention to provide a filtration medium, comprised of, in part, porous iron.

It is an object of the present invention to provide additional surface modifiers and binders for the porous iron.

DESCRIPTION OF THE PREFERRED EMBODIMENTS

Figure 1:
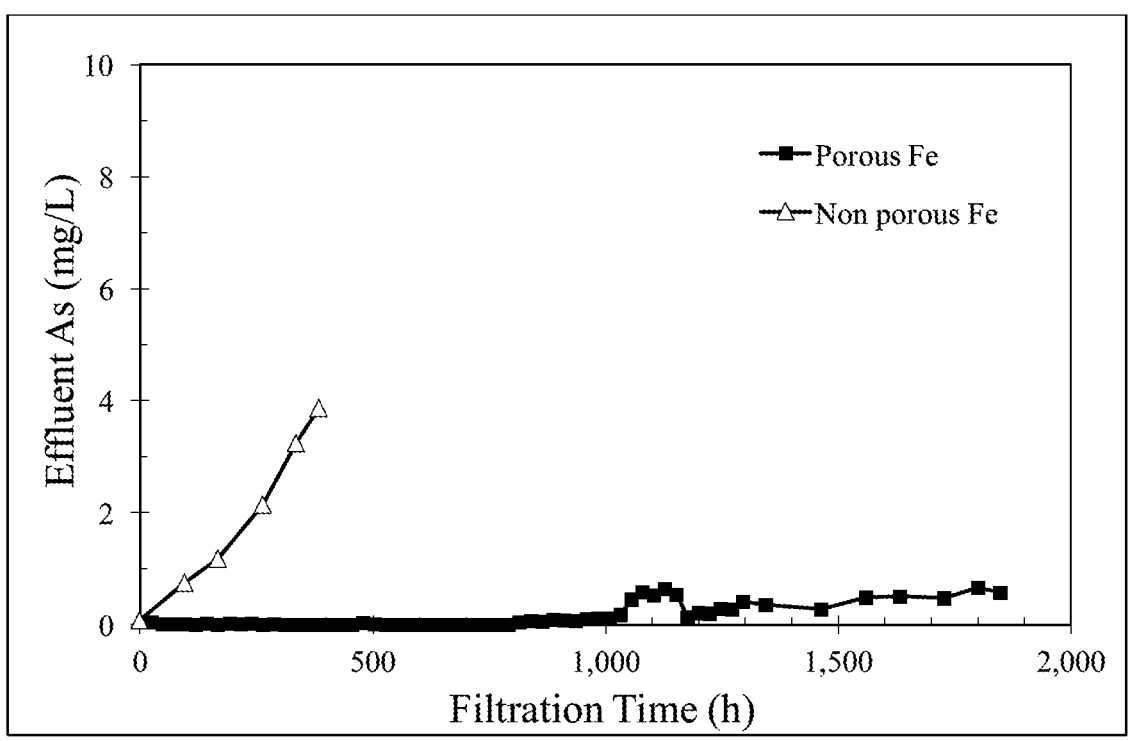
FIG. 1 illustrates filtration results of an arsenate solution using porous and non-porous granular Fe, initial As(V) concentration in water=10 mg/L, initial pH=7.0, empty bed contact time (EBCT)=2 hours.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

The present invention and its embodiments comprise of methods for using iron powder or mixture of iron and other metal and adsorbent powders and surface modifier and binder to produce porous granular iron products having high permeability, hydrophilicity, reactivity and capacity for treatment of inorganic and organic contaminants in liquid and gas. The surface modifier and binder could be selected from the group of compounds consisting of polyvinyl alcohol, povidone, polyvinyl pyrrolidone, and polyvinyl acetate etc. The granular products are used in a filter, reactor, in situ permeable reactive barrier for treatment of inorganic and organic contaminants in water, solid, and gas.

In the following examples, hydrophilic and porous granular iron and composite of iron and other materials were prepared. The agglomerated materials were packed into filters for treatment of inorganic and organic compounds in water. The experimental results demonstrated that the hydrophilic and porous particles were much more effective than non-porous iron particles, and that after the media were exhausted, they could be regenerated for reuse repeatedly.

Example 1

Iron (Fe) powder was mixed with a polyvinyl alcohol, the aggregated iron was dried at 110° C. The dried aggregates were sieved to obtain porous granular iron in a range of about 0.42 to about 1.19 mm. Table 1, below, shows the characteristics of the porous granular iron of the present invention and commercial non-porous iron particles. The aggregated porous iron product has much low bulk density and much large specific surface area than the commercial non-porous iron particles.

TABLE 1

Characteristics of the porous granular Fe and commercial non-porous iron particles

| Fe products | Surface area ($m^2/g$) | Particle size (mm) | Bulk Density (g/mL) |
| --- | --- | --- | --- |
| Porous granular Fe | 3.7 | 0.42-1.19 | 1.0-1.2 |
| Non-porous Fe particles | <0.5 | 0.282-0.50 | 4.3 |

The porous granular iron particles were packed in a filter. Water containing 10 mg/L of arsenate (As(V)) was pumped through the filter at an empty bed contact time of 2 hours. For comparison purpose, another filtration test was conducted using a filter packed with the non-porous iron particles under the same filtration conditions. FIG. 1 shows that As(V) was reduced from 10 mg/L in the water to less than 0.7 mg/L by the porous granular iron during 1848 hours of filtration. In contrast, the effluent As concentration from the non-porous iron filter increased rapidly to 3.9 mg/L during 384 hours of filtration.

Example 2

Figure 2:
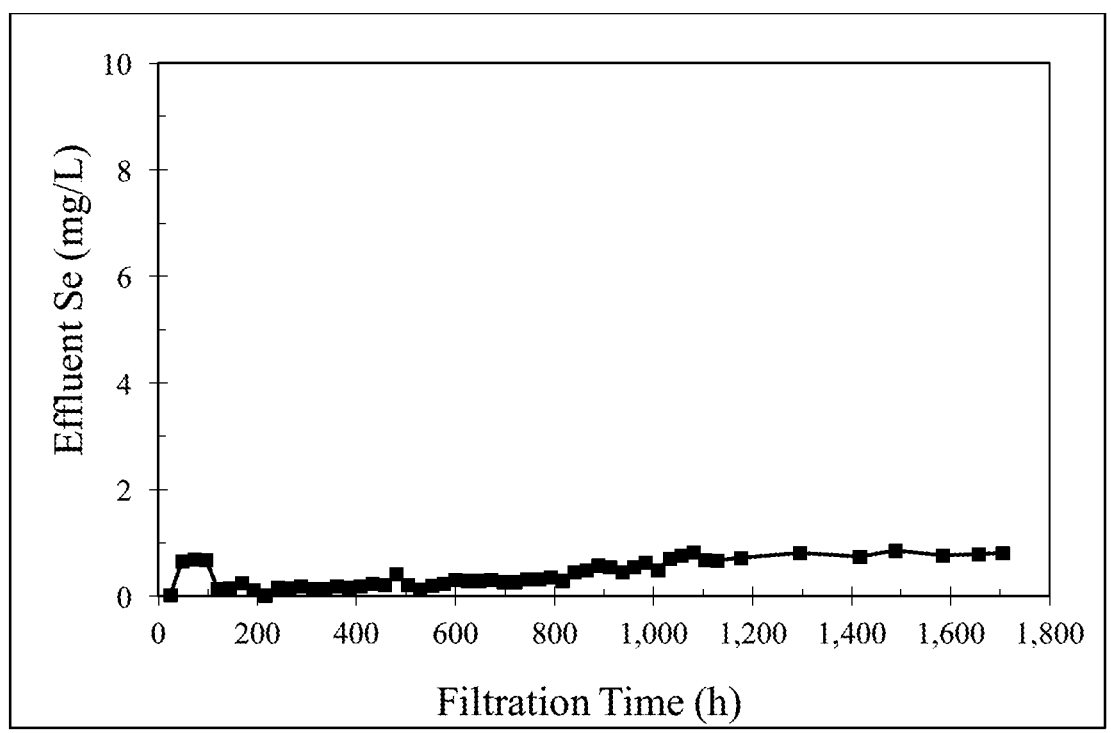
FIG. 2 illustrates filtration results of a selenate solution using porous granular Fe, initial Se(VI) concentration=10 mg/L, initial pH=6.8, EBCT=2 hours.

A selenate solution containing 10 mg/L of Se(VI) was treated with a filter packed with the porous granular iron. The results in FIG. 2 indicate Se(VI) was reduced to less the 0.8 mg/L during 1704 hours of filtration.

Example 3

Figure 3:
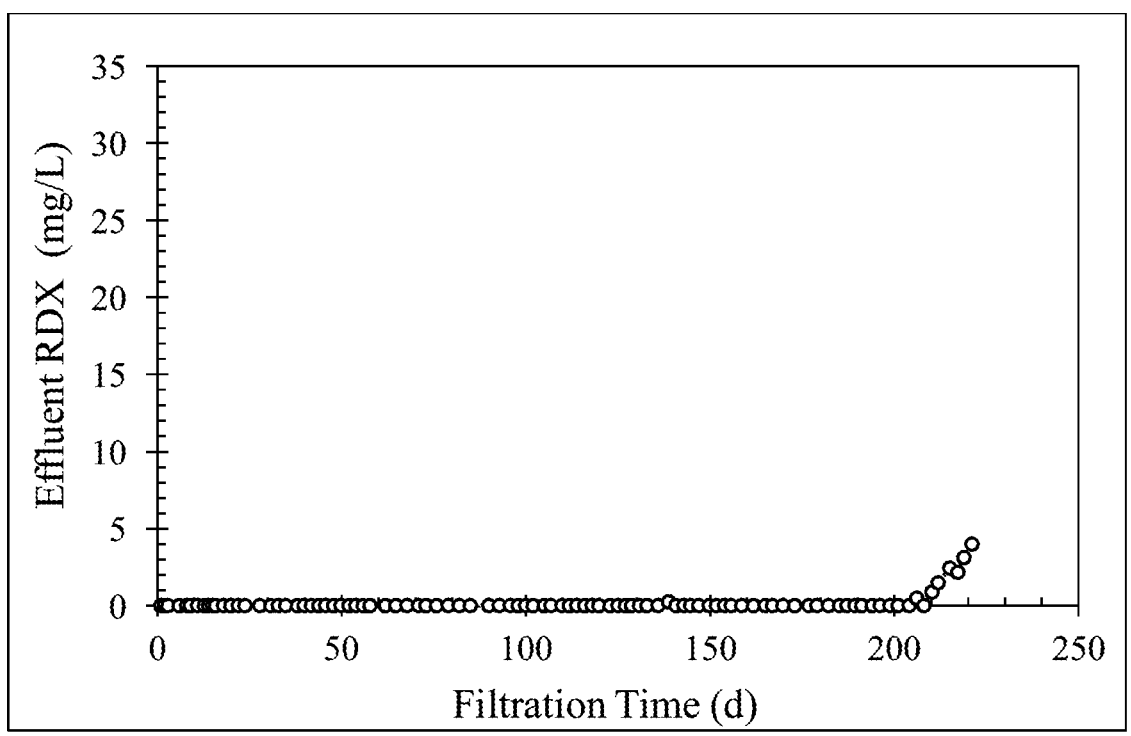
FIG. 3 illustrates filtration results of a 1,3,5-trinitroperhydro-1,3,5-triazine ($C_3H_6N_6O_6$, RDX) solution using porous granular Fe, initial RDX concentration=35 mg/L, initial pH=5, EBCT=2 hour.

A filter packed with the porous granular iron was used to treat water containing 35 mg/L of 1,3,5-trinitroperhydro-1,3,5-triazine ($C_3H_6N_6O_6$, RDX) at an empty bed contact time of 2 hours. FIG. 3 shows that RDX concentration was reduced to less than 0.05 mg/L by the filter during 210 days of filtration. The results demonstrated that the granular iron product could be used for effective treatment of the nitro organic compound for a long period of time. In addition, the iron particles did not cement together in the filter. Common iron particles would cement together in filters after several months of treatment of water due to formation of iron oxides, which would significantly reduce the reactivity and permeability of the packed iron.

Example 4

Figure 4:
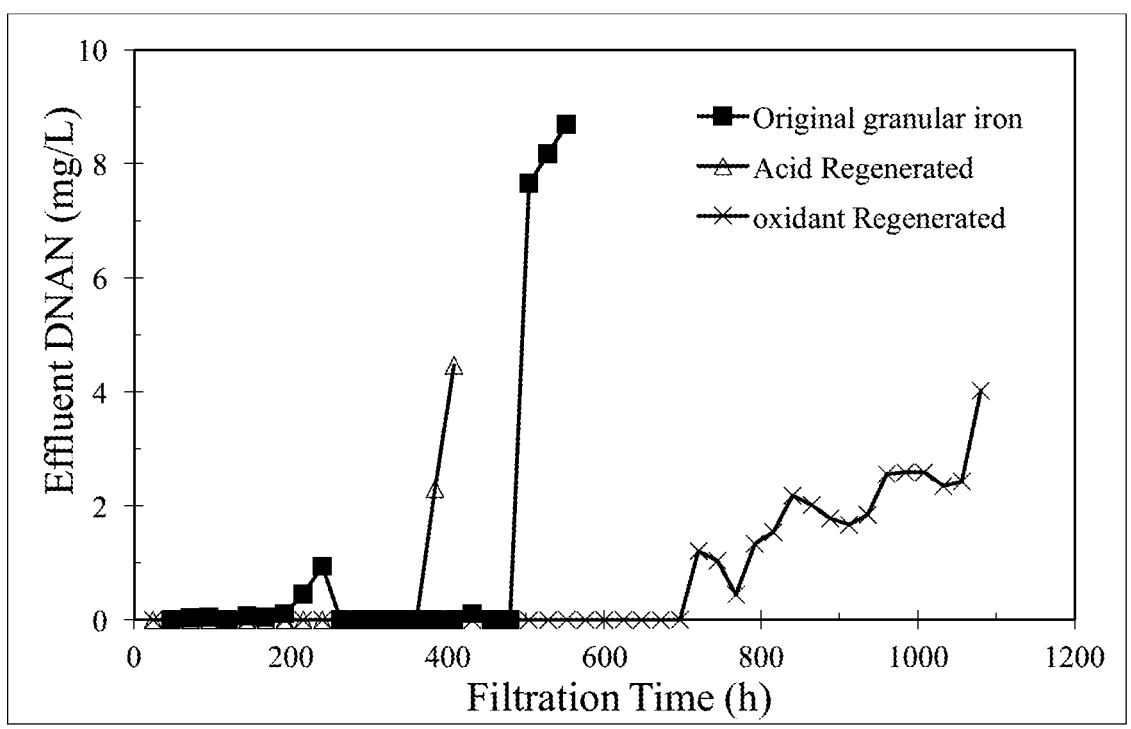
FIG. 4 illustrates filtration results of a DNAN solution using porous granular Fe and regenerated Fe, initial DNAN concentration=10 mg/L, initial pH=7.3, EBCT=1 hour.

The removal results of 2,4-dinitroanisole (DNAN), a nitro organic compound, by a porous granular iron filter were presented in FIG. 4. The original porous granular iron reduced DNAN concentration from 10 to less than 0.9 mg/L in the first 500 hours of filtration. The oxidant-regenerated and acid-regenerated iron filtered 700 and 350 hours of water, respectively before DNAN breakthrough occurred. The results indicated that the regenerated porous granular iron can be used for effective treatment of nitro organic compounds.

Example 5

Figure 5:
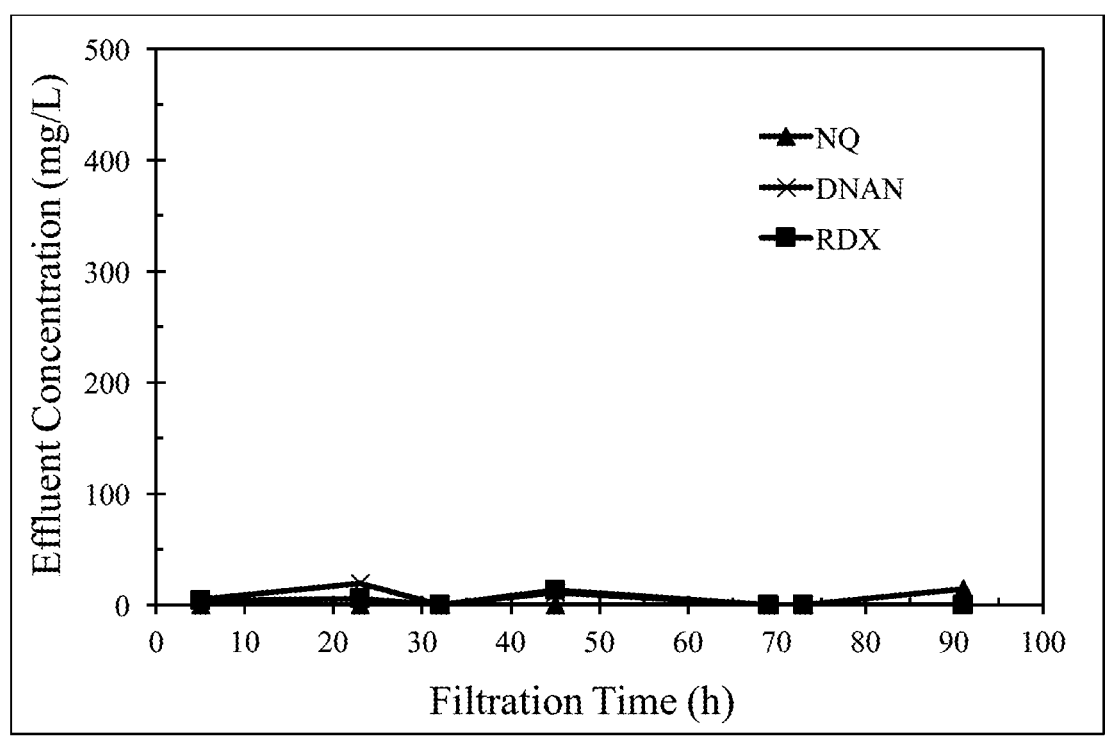
FIG. 5 illustrates filtration results of wastewater using porous granular FeAC, initial NQ=508 mg/L, DNAN=72 mg/L, RDX=273 mg/L, initial pH=2.65, EBCT=3 hours.

A porous granular FeAC product was used to treat a solution containing nitroimines (NQ), RDX, DNAN. The results in FIG. 5 indicate that the concentrations of the nitro organic compounds were reduced to less the 20 mg/L during 91 hours of filtration.

Example 6

Figure 6:
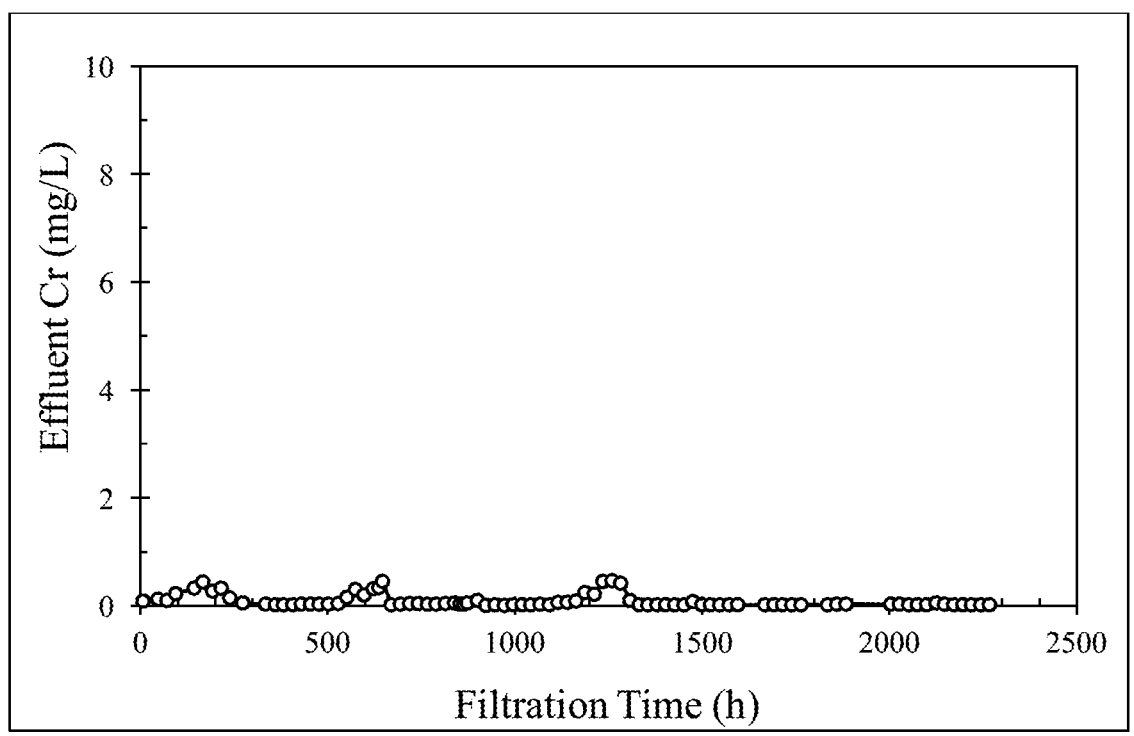
FIG. 6 illustrates filtration results of a chromate solution using porous granular FeCu, Cr(VI) concentration=10 mg/L, pH=3.5, EBCT=2.5 hours.

The porous granular FeCu product was used in a column filter for treatment of water containing 10 mg/L of Cr(VI). FIG. 6 shows that the total Cr(VI) concentration was reduced to less than 0.4 mg/L by the filter during 2270 hours of filtration treatment.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A method for producing porous granular composite iron for removal of inorganic and organic contaminants from liquid streams, the method comprising the steps of:
    mixing raw iron powders with at least one surface modifier and binder compound to induce a formation of hydrophilic granules;
    drying the hydrophilic granules to form a porous aggregate,
        wherein the porous aggregate has a particle size in a range of about 0.15 mm to about 30 mm and a surface area larger than 0.5 m$^2$/g;
    passing a contaminated liquid through a bed of the porous aggregate.

2. The method of claim 1 wherein the bed of the porous aggregate is in a filter, a vessel, or in situ permeable reactive barrier.

3. The method of claim 1 wherein the bed of the porous aggregate is in a batch reactor.

4. The method of claim 1, wherein said at least one surface modifier and binder compound are selected from the group consisting of: polyvinyl alcohol, povidone, polyvinyl pyrrolidone, and polyvinyl acetate.

5. The method of claim 1, wherein said mixing the raw iron powders with the at least one surface modifier and binder compound is carried out in mixers and/or granulators.

6. The method of claim 1, wherein said hydrophilic granules are dried in a temperature range of about 50° C. to about 200° C.

7. The method of claim 1, wherein said inorganic and organic contaminants are arsenic, selenium, lead, chromium, cadmium, copper, mercury, uranium, chlorinated and nitro organic compounds.

8. The method of claim 1, further comprising the step of:
    regenerating the porous aggregate with an oxidant or an acid for reuse.

9. A method for producing porous granular composite iron for removal of inorganic and organic contaminants from liquid streams, the method comprising the steps of:
    mixing iron powder and at least one other metal and/or adsorbent powder with at least one surface modifier and binder compound to induce a formation of hydrophilic granules;
    drying the hydrophilic granules to form a porous aggregate,
        wherein the porous aggregate has a particle size in a range of about 0.15 mm to about 30 mm and a surface area larger than 0.5 m$^2$/g;
    passing a contaminated liquid through a bed of the porous aggregate.

* * * * *